Patented Jan. 23, 1951

2,539,341

UNITED STATES PATENT OFFICE 2,539,341

PREPARATION OF VINYL CYCLOHEXENE DICHLOROHYDRINS

Owen Clement Wentworth Allenby, McMasterville, Quebec, and George Jordan Harris, Beloeil Station, Quebec, Canada, assignors to Canadian Industries Limited, Montreal, Quebec, Canada, a corporation of Canada No Drawing. Application April 22, 1947, Serial No. 743,199. In Canada January 18, 1947

1 Claim. (Cl. 260—617)

This invention relates to chlorohydrins of vinylcyclohexene and to a process for preparing them. There are a number of isomeric vinylcyclohexenes which theoretically will form chlorohydrins. This invention relates in particular to the dichlorohydrins of 4-vinylcyclohexene and to a process for preparing them.

4-vinylcyclohexene is obtained readily by the dimerization of butadiene by the action of heat and pressure. No references to the chlorohydrins of this diolefin are known to exist in the literature. Chlorohydrins of certain other compounds are known to be useful materials which undergo various reactions to give other new and useful compounds.

The presence of two double bonds in 4-vinylcyclohexene admits of two general types of chlorohydrin derivatives—monochlorohydrins and dichlorohydrins. The former still retain a residual olefinic bond, while the latter are completely saturated. A number of isomers are possible, the structures conforming to the generalization below:

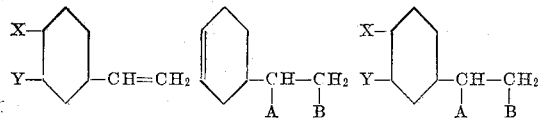

in which A and B may be hydroxyl or chlorine, A being chlorine when B is hydroxyl and A being hydroxyl when B is chlorine, and in which X and Y may be hydroxyl or chlorine, X being chlorine when Y is hydroxyl and X being hydroxyl when Y is chlorine. Besides the position isomers indicated there is the possibility of cis-trans isomerism in the cyclohexane ring and diastereoisomerism whenever two or more asymmetric centers are present.

It is an object of this invention to provide a process for preparing chlorohydrins of 4-vinylcyclohexene. A further object is to produce chlorohydrins of 4-vinylcyclohexene, said chlorohydrins being new and useful compounds. An additional object is to provide a process for preparing dichlorohydrins of 4-vinylcyclohexene. A still further object is to produce dichlorohydrins of 4-vinylcyclohexene, said dichlorohydrins being new and useful compounds. Additional objects will become apparent from an examination of the following description and claims.

These and other objects are accomplished according to the invention hereinafter described which broadly comprises reacting hypochlorous acid with 4-vinylcyclohexene in an aqueous medium, followed by isolation of the chlorohydrins produced.

In a more restricted embodiment, this invention comprises reacting a dispersion of 4-vinylcyclohexene in water with a solution containing hypochlorous acid, said hypochlorous acid solution being added slowly to the 4-vinylcyclohexene water dispersion until a slight excess of hypochlorous acid is present. As an alternative procedure, an acid stronger than hypochlorous acid is added to a dispersion of 4-vinylcyclohexene in an aqueous solution of a hypochlorite, thus liberating hypochlorous acid which then reacts with the 4-vinylcyclohexene to form the dichlorohydrins. Another embodiment of this invention comprises adding an aqueous solution of a hypochlorite to a dispersion of 4-vinylcyclohexene in dilute mineral acid, the hypochlorous acid liberated reacting with the 4-vinylcyclohexene to form the dichlorohydrins. In still another embodiment of this invention, aqueous solutions of a hypochlorite and a dilute mineral acid are run simultaneously into a dispersion of 4-vinylcyclohexene in water to form 4-vinylcyclohexene dichlorohydrins. The dichlorohydrins of 4-vinylcyclohexene which are produced according to the above embodiments may be isolated by extraction with a solvent, followed by removal of the solvent by distillation.

The following examples are given for illustrative purposes only and are not to be construed as restricting or limiting the invention herein described in any way.

Example I

Into a suspension of 130 g. powdered calcium carbonate in 1500 cc. water is bubbled 65 g. chlorine gas, the temperature being maintained around 2° C. by external cooling with ice. The mixture is stirred vigorously during the addition of the chlorine which is complete in approximately two hours. The suspension is filtered to remove the excess calcium carbonate and the filtrate on analysis contains 2.54% hypochlorous acid. A total of 1400 cc. of this solution is added over a period of thirty minutes to a dispersion of 36 g. 4-vinylcyclohexene in 300 cc. water. The mixture is stirred vigorously during the addition which requires about thirty minutes and the temperature is kept below 10° C. by cooling in ice. At the end of the addition, a positive test for hypochlorite is obtained in the reaction mixture. Stirring is continued for about five minutes to ensure completion of the reaction, when the concentration of hypochlorous acid in the mixture is 0.10% as indicated by titration. The titre of the original hypochlorous acid solution drops from its initial concentration of 2.54% to a value of 2.48% during the addition, representing an average concentration of 2.51%. Hence 33.4 g. of hypochlorous acid is actually used up during the reaction, the theoretical being 35.0 g. for the formation of dichlorohydrins. The excess hypochlorous acid is destroyed with sodium sulphite and a small quantity of insoluble material is removed by the addition of "filteraid" followed by filtration. The clear filtrate is extracted several times with ether, the dichlorohydrins being recovered from the solvent by evaporation. A total of 49.3 g. of dichlorohydrins is obtained, representing a yield of 70%. The product is a viscous straw coloured liquid having a chlorine content of 32.5 to 33.5% (theoretical=33.3% for dichlorohydrins of 4-vinylcyclohexene).

Example II

The mixture of dichlorohydrins obtained in Example I is treated with a solution of 40 g. sodium hydroxide in 500 cc. water with stirring for fifteen minutes at 25° C. The mixture eventually becomes homogeneous. The 4-vinylcyclohexene dioxide which is produced is removed by extraction with carbon tetrachloride and is recovered by fractionation at five mm. pressure. The main portion of the distillate boils at 88–92° C. at 5 mm. and weighs 26.1 g. representing an 81% yield of dioxide based on the quantity of dichlorohydrins used. Physical constants of purified dioxide are as follows: $N_D^{27}=1.476$; $D_4^{27}=1.091$. Analysis: C=68.4, H=8.33, theoretical: C=68.6, H=8.57.

Example III

Into a solution of 110 g. sodium carbonate in 1500 cc. water is passed 60 g. gaseous chlorine over a period of thirty minutes with stirring and cooling to 2° C. The hypochlorite content, calculated as free HOCl, is 2.72%. 1500 cc. of this solution is added over a period of twenty minutes to a dispersion of 36 g. 4-vinylcyclohexene in 300 cc. water, agitating vigorously and keeping the temperature below 10° C. After stirring an additional five minutes, a positive test for hypochlorite is still present, the hypochlorous acid content being 0.42%. The titre of the original hypochlorous acid solution drops to 2.56% at the end of the addition, representing an average concentration of 2.64%. Thus a total of 32.1 g. of hypochlorous acid has reacted, the theoretical being 35.0 for dichlorohydrin formation.

A solution of 70 g. sodium hydroxide in 100 cc. water is now added, followed immediately by the addition of 20 g. sodium sulphite to destroy the excess hypochlorite. The mixture is stirred for thirty minutes at 10° C. The 4-vinylcyclohexene dioxide produced is extracted with carbon tetrachloride and isolated by distillation. A total of 27.8 g. of dioxide is obtained, representing a yield of 60% based on the weight of 4-vinylcyclohexene originally used.

Example IV

Into a solution of 74 g. sodium hydroxide dissolved in 1500 cc. water is passed 62 g. gaseous chlorine with stirring and cooling to 3° C. The hypochlorous acid is liberated from its sodium salt by the addition of 44.8 g. of 95.5% sulphuric acid in 200 cc. water. The final volume is 1770 cc., titrating 2.42% hypochlorous acid. This solution is added over a period of twenty minutes to a dispersion of 36 g. 4-vinylcyclohexene in 300 cc. water, with vigorous agitation and keeping the temperature below 10° C. Stirring is continued for an additional five minutes. The mixture has a positive hypochlorite test and contains 0.40% hypochlorous acid by titration. Hence a total of 34.7 g. hypochlorous acid has reacted, the theoretical being 35.0 g. for dichlorohydrin formation.

A solution of 60 g. sodium hydroxide in 100 cc. water is now added, followed by 22 g. sodium sulphite to destroy the excess hypochlorite. After stirring at 10° C. for thirty minutes, the dioxide produced is extracted with carbon tetrachloride and recovered by distillation. A total of 25 g. of 4-vinylcyclohexene dioxide is obtained which represents a yield of 59% based on the original weight of 4-vinylcyclohexene used.

Example V

Into 2000 cc. of a 3.5% aqueous solution of sodium hydroxide is bubbled 60 g. chlorine gas over a period of thirty minutes with stirring and cooling to 3° C. The hypochlorite content (calculated as HOCl) is 2.12%. To this solution is added 36 g. 4-vinylcyclohexene and then with vigorous agitation, a solution of 41.5 g. of 95.5% sulphuric acid dissolved in 350 cc. water, keeping the temperature below 10° C. This is sufficient acid to liberate nearly all of the hypochlorous acid from the sodium hypochlorite. Addition is complete in twenty minutes and stirring is continued for a further five minutes. The hypochlorite content is now 0.38%, hence 33.5 g. hypochlorous acid has reacted, the theoretical for dichlorohydrin formation being 35.0 g.

A solution of 70 g. sodium hydroxide in 350 cc. water is now added and sufficient sodium sulphite to decompose the excess hypochlorite. The mixture is stirred for thirty minutes at 10° C. On extraction with carbon tetrachloride, 4-vinylcyclohexene dioxide is removed and is recovered by fractional distillation. 29.6 g. of dioxide is obtained, representing a yield of 63% based on the weight of 4-vinylcyclohexene originally used.

Example VI

Into 2000 cc. of a 3.5% solution of aqueous sodium hydroxide is bubbled gaseous chlorine with stirring and cooling to 3° C. until 60 g. have been absorbed. This requires approximately thirty minutes. The titre of the solution is 2.2% expressed as hypochlorous acid. This solution is added slowly with vigorous agitation at 25° C. to a dispersion of 36 g. 4-vinylcyclohexene in 400 cc. water containing 41.5 g. of 95.5% sulphuric acid. The addition is continued until a positive hypochlorite test is obtained. At this point a total of 1550 cc. has been added, the hypochlorous acid actually used thus being 34.1 g. The theoretical for dichlorohydrin formation is 35.0 g.

Two hundred cc. of a 35% aqueous solution of sodium hydroxide is now added to the mixture and stirring is continued at 20° C. for one-half hour. The 4-vinylcyclohexene dioxide produced is extracted with carbon tetrachloride and recovered by distillation. A total of 22.1 g. is obtained representing a yield of 48%.

Example VII

Sixty g. chlorine is bubbled into 1500 cc. of a 4.66% aqueous solution of sodium hydroxide over a period of one-half hour with vigorous stirring at 3° C. The titre of the hypochlorite solution is 3.30%. Thirty-six g. 4-vinylcyclohexene is now added and carbon dioxide gas passed in slowly at 10° C. until eventually the hypochlorite content drops to 1.0%. This corresponds to the reaction of 34.5 g. hypochlorous acid, the theoretical being 35.0 g. for dichlorohydrin formation.

A solution of 140 g. sodium hydroxide in 300 cc. water is now added and the mixture stirred at 15° C. for one-half hour. The 4-vinylcyclohexene dioxide so produced is extracted from the solution with carbon tetrachloride and on distillation amounts to 27.0 g., representing a yield of 58% based on the weight of 4-vinylcyclohexene originally used.

*Example VIII*

Into 1000 cc. of a 7% aqueous solution of sodium hydroxide, chlorine gas is bubbled with stirring and cooling at 3° C. until 60 g. are absorbed. The titre of this solution is 4.2% expressed as hypochlorous acid. Thirty-six g. 4-vinylcyclohexene is then added followed by the slow addition of 200 cc. of an aqueous solution containing 41.5 g. 95.5% sulphuric acid, stirring vigorously and keeping the temperature below 10° C. The addition requires one-half hour, the titre of the unreacted hypochlorous acid being 0.77%. This corresponds to the addition of 32.8 g. hypochlorous acid, 35.0 g. being the theoretical for dichlorohydrin formation.

Two hundred cc. of an aqueous solution containing 70 g. sodium hydroxide are then added followed by sufficient sodium sulphite to destroy the excess hypochlorite and the mixture stirred at 10-15° C. for one-half hour. The 4-vinylcyclohexene dioxide is removed by extraction with carbon tetrachloride and recovered by distillation at 5 mm. pressure. It weighs 21 g. representing a yield of 45%.

*Example IX*

Chlorine gas is bubbled into 1000 cc. of a 10.5% aqueous solution of sodium hydroxide with stirring and cooling to 3° C. until 90 g. has been absorbed. The addition requires thirty-five minutes. This solution (5.5% as hypochlorous acid) is added slowly over a period of twenty minutes to a dispersion of 54 g. 4-vinylcyclohexene and 300 cc. of an aqueous solution containing 62.3 g. of 95.5% sulphuric acid. The temperature is not allowed to rise above 10° C. and the addition is stopped when a strong positive test for hypochlorite is obtained.

A solution of 105 g. sodium hydroxide in 200 cc. water is now added and the mixture stirred for 30 minutes at 10° C. The mixture is then extracted with carbon tetrachloride and the extract distilled at 5 mm. pressure. A total of 9 g. 4-vinylcyclohexene dioxide is obtained along with a considerable amount of fore-run containing the monoxide. The yield of dioxide is 13%.

*Example X*

Into 666 cc. of a 10.5% solution of sodium hydroxide a total of 60 g. chlorine is bubbled with vigorous agitation, keeping the temperature below 3° C. The titre of this solution is 5.5% calculated as hypochlorous acid. This is added slowly with vigorous stirring to a dispersion of 36 g. 4-vinylcyclohexene in 200 cc. of an aqueous solution containing 41.5 g. 95.5% sulphuric acid. The temperature is maintained below 10° C. The mixture is tested periodically with starch-iodide paper and when it is noted that hypochlorous acid is no longer being rapidly taken up, the addition is stopped. At this stage, due to the limited solubility of the various chlorohydrins in the reaction mixture, they begin to come out as heavy sticky oils. This material contains quantities of monochlorohydrins and to provide adequate contact between them and the hypochlorous acid solution, a solvent (150 cc. ethylene dichloride) is added. The hypochlorite addition is now continued, addition being controlled so that no substantial excess of hypochlorous acid is present.

When the reaction is finished, 200 cc. of 35% sodium hydroxide solution is added and the mixture stirred for one hour at 15-20° C. From the ethylene dichloride layer is obtained 12.3 g. 4-vinylcyclohexene dioxide on distillation. The water layer is found to contain an additional gram or two of dioxide. The total yield of dioxide is approximately 30%.

*Example XI*

Chlorine is passed into 1000 cc. of a 10.5% aqueous solution of sodium hydroxide with stirring at 3° C. until 90 g. has been absorbed. The titre of this solution is 5.52% calculated as hypochlorous acid. The solution is added slowly to a suspension of 54 g. of 4-vinylcyclohexene in 300 cc. water, with the simultaneous addition of 30% sulphuric acid. The reaction mixture is always kept slightly on the acid side, and addition of the hypochlorite solution is stopped when a heavy oil begins to appear. At this point a positive test for hypochlorite is obtained. Two hundred cc. of ethylene dichloride are now added and the addition of the hypochlorite and acid solutions continued. At the end of the reaction, approximately three quarters of the hypochlorite solution has been added and a total of 200 cc. of the sulphuric acid.

A solution of 100 g. sodium hydroxide in 200 cc. water is now added, and the mixture stirred at 15° C. for one-half hour. The 4-vinylcyclohexene dioxide is removed by extraction with carbon tetrachloride and after distillation at 5 mm. pressure weighs 21.4 g. This represents a yield of 30%.

*Example XII*

Gaseous chlorine is bubbled into a dispersion of 36 g. 4-vinylcyclohexene in 2000 cc. water with vigorous agitation at 1° C. until a positive test for hypochlorite persists. At this point, 58 g. chlorine has been absorbed. A small quantity of sodium sulphite is added to destroy the excess hypochlorite, then 70 g. sodium hydroxide and the mixture stirred at 10° C. for thirty minutes. On extraction with carbon tetrachloride followed by distillation, 4-vinylcyclohexene dioxide is obtained weighing 6.5 g. This represents a yield of about 14% based on the amount of 4-vinylcyclohexene originally used.

*Example XIII*

Chlorine gas is bubbled into 2000 cc. of a 3.5% aqueous solution of sodium hydroxide cooled to 3° C. until 60 g. have been absorbed. This requires one-half hour and the titre of the solution is 2.0% expressed as hypochlorous acid. Thirty-six g. 4-vinylcyclohexene is now added and then slowly over a period of twenty minutes with vigorous agitation, 350 cc. of an aqueous solution containing 41.5 g. of 95.5% sulphuric acid, keeping the temperature below 10° C. After stirring an additional five minutes, the titre of the solution is 0.1% as hypochlorous acid.

A solution of 70 g. sodium hydroxide and 20 g.

sodium sulphite in 350 cc. water is now added and the mixture stirred and heated as rapidly as possible to 70° C. where it is held for thirty minutes. After cooling, the 4-vinylcyclohexene dioxide is removed by extraction with carbon tetrachloride. A total of 7.2 g. dioxide is obtained representing a 15% yield.

It is to be understood that these examples describe specific embodiments of this invention which, as will be apparent to one skilled in the art, may be subject to wide variation and modification without departing from the spirit and scope of the invention.

We have found that only poor yields of the dichlorohydrins result on passing chlorine into a dispersion of 4-vinylcyclohexene in water or in a solution of sodium carbonate or in a suspension of calcium carbonate in water. It would thus appear that the presence of free chlorine is detrimental to the formation of the dichlorohydrins of 4-vinylcyclohexene. This may be because the rate at which chlorine forms hypochlorous acid according to the equation $Cl_2 + H_2O \rightarrow HOCl + HCl$ is lower than the rate at which it adds to the double bonds in 4-vinylcyclohexene. As a consequence we prefer to produce the hypochlorite or the hypochlorous acid solution out of contact with the 4-vinylcyclohexene.

The preparation of the hypochlorite solution may be accomplished by the use of chlorine in conjunction with aqueous solutions or dispersions of other bases in addition to the ones illustrated in the above examples. Such bases include the hydroxides and carbonates of the alkali and alkaline earth metals for example calcium hydroxide, barium hydroxide, barium carbonate, potassium hydroxide, potassium carbonate, magnesium hydroxide and magnesium carbonate amongst others. In general, any base unattacked by hypochlorous acid may be employed to react with the hydrochloric acid which is produced in accordance with the reaction $Cl_2 + H_2O \rightarrow HCl + HOCl$. The base need not necessarily be strong enough to react with the hypochlorous acid produced. When it is desired to convert the dichlorohydrin to the dioxide, in the preparation of the hypochlorite it is preferred not to use a base containing a metal whose hydroxide is essentially insoluble in strongly alkaline solutions because this may necessitate filtration of the final reaction mixture before the dioxide can be extracted. It is preferred to use one of the stronger soluble bases such as for example one of the alkali hydroxides. Hypochlorite solutions made with such hydroxides are in general fairly stable and the chlorine can be introduced at a much greater rate than when an insoluble base such as calcium carbonate is employed. Sodium hydroxide or sodium carbonate are especially preferred in the practice of this invention.

Although in the preparation of the dichlorohydrins of 4-vinylcyclohexene hypochlorite solutions of a concentration 5.5% or lower are disclosed in the examples, higher concentrations may be used. It is preferred not to employ too highly concentrated solutions because lower yields of the desired product result. Lower yields seem to be due in part to the separation of the monochlorohydrins as a heavy sticky oil when the more concentrated solutions are employed. Contact of this oil with the hypochlorous acid solution is very poor and further reaction to form the dichlorohydrins is prevented. If these chlorohydrins are subsequently treated with caustic, considerable vinylcyclohexene monoxide is produced. We have found that the monochlorohydrins can be converted substantially completely to the dichlorohydrins by the addition of a non-reactive solvent for the chlorohydrins, such as ethylene dichloride, just at the point where the oil begins to appear (Example X). Intimate contact of the two phases is now possible and the hypochlorous acid adds on to the remaining unsaturated linkage. Lower yields at higher concentrations also result however because of chlorination which occurs to an increasing extent as the concentration of the hypochlorite solution is increased.

Although in the addition of the hypochlorous acid to the 4-vinylcyclohexene, temperatures of 25° C. and lower are disclosed, somewhat higher temperatures may be employed. It is preferred to keep the temperature at 10° C. or lower because better yields of product are obtained.

In the extraction of the 4-vinylcyclohexene dichlorohydrins from the aqueous reaction mixture, solvents other than ether may be employed. A number of chlorinated hydrocarbons have also been found to be effective, ethylene dichloride and chloroform being excellent for this purpose. In general any solvent may be employed which is essentially insoluble in water and which will dissolve the dichlorohydrins without being attacked by them.

The herein disclosed process may be operated continuously or batch-wise and no limitation in the mode or order of addition of the reactants is to be construed.

As many apparently widely different embodiments of this invention may be made without departing from the spirit and scope thereof, it is to be understood that the invention is not limited to the specific embodiments thereof except as defined in the appended claim.

Having thus described our invention what we claim is:

A process for the preparation of the dichlorohydrins of 4-vinylcyclohexene which comprises adding an aqueous solution of sulphuric acid having a sulphuric acid concentration of from 10% to 20% by weight to a suspension of one mol of 4-vinylcyclohexene in an aqueous solution of two mols of sodium hypochlorite having an hypochlorous acid concentration of from 2% to 4.5% by weight, at a temperature not in excess of 10° C.

OWEN CLEMENT WENTWORTH ALLENBY.
GEORGE JORDAN HARRIS.

REFERENCES CITED

The following references are of record in the file of this patent:

UNITED STATES PATENTS

| Number | Name | Date |
| --- | --- | --- |
| 1,446,873 | Brooks | Feb. 27, 1923 |
| 1,477,113 | Essex et al. | Dec. 11, 1923 |
| 1,594,608 | Essex et al. | Aug. 3, 1926 |
| 2,116,439 | Levine et al. | May 3, 1938 |
| 2,463,850 | Brooks | Mar. 8, 1949 |

OTHER REFERENCES

Fieser: Organic Chemistry, pub. by D. C. Heath & Co., Boston (1944), page 63.

Kendall et al.: Jour. Am. Chem. Soc., vol. 48, 1388-9 (1926).